(12) United States Patent
Atwood et al.

(10) Patent No.: US 8,172,924 B2
(45) Date of Patent: May 8, 2012

(54) METHOD OF SEPARATING AND STORING VOLATILE GASES

(76) Inventors: Jerry L. Atwood, Columbia, MO (US); Leonard J. Barbour, Matieland (ZA); Agoston Jerga, Columbia, MO (US)

( * ) Notice: Subject to any disclaimer, the term of this patent is extended or adjusted under 35 U.S.C. 154(b) by 1031 days.

(21) Appl. No.: 11/547,447

(22) PCT Filed: Apr. 18, 2005

(86) PCT No.: PCT/US2005/013093
§ 371 (c)(1),
(2), (4) Date: May 12, 2008

(87) PCT Pub. No.: WO2006/055030
PCT Pub. Date: May 26, 2006

(65) Prior Publication Data
US 2012/0036999 A1    Feb. 16, 2012

Related U.S. Application Data

(60) Provisional application No. 60/563,382, filed on Apr. 19, 2004.

(51) Int. Cl.
*B01D 53/02* (2006.01)
*C07C 39/16* (2006.01)

(52) U.S. Cl. .............. 95/95; 95/139; 95/140; 502/526; 568/719

(58) Field of Classification Search ............. 95/95, 139, 95/140; 96/108; 206/0.7; 502/401, 526; 568/718, 719
See application file for complete search history.

(56) References Cited

U.S. PATENT DOCUMENTS

| | | | | |
|---|---|---|---|---|
| 6,136,071 A * | 10/2000 | Lamartine et al. | ............. | 95/128 |
| 6,500,238 B1 * | 12/2002 | Brandes et al. | ................. | 95/148 |
| 7,132,571 B2 * | 11/2006 | Atwood et al. | ............... | 564/308 |
| 7,282,083 B2 * | 10/2007 | Rudkevich | ...................... | 95/128 |
| 2003/0228974 A1 * | 12/2003 | Katz et al. | ..................... | 502/150 |
| 2004/0087666 A1 * | 5/2004 | Atwood et al. | ............... | 514/734 |

OTHER PUBLICATIONS

Brouwer, Eric B., et al, A chlorophobic pocket in the p-tert-butylcalix[4]arene cavity: a test site for molecular recognition investigated by 13C CP MAS NMR and X-ray crystallography, Chem. Commun., 1998, pp. 587-588.*

* cited by examiner

*Primary Examiner* — Frank Lawrence, Jr.
(74) *Attorney, Agent, or Firm* — Locke Lord, LLP

(57) ABSTRACT

A method of using a crystallographic framework of sterically bulky calixarene molecules to selectively separate and/or store volatile gas components. Sterically bulky calix[4]arenes or their derivatives form a crystalline lattice that has relatively large lattice voids, is nonporous, and is held together predominately by van der Weals forces. The calix[4]arene lattice can form a guest-host assembly by absorbing a desired volatile gas guest component into the crystalline lattice without any phase shift or other change to the lattice structure. The crystalline calixarene can also be desirably used to purify a gas mixture by removing one or more volatile gas contaminants or by removing and storing the desired volatile gas component. This method can preferably be used to purify a hydrogen gas stream by removing the carbon dioxide and carbon monoxide contaminants or to remove and store oxygen from the air or carbon dioxide and carbon monoxide from combustion gases.

25 Claims, 3 Drawing Sheets

METHOD OF SEPARATING AND STORING VOLATILE GASES

CROSS-REFERENCE TO RELATED APPLICATIONS

This application claims the benefit of priority from U.S. provisional patent application Ser. No. 60/563,382, filed Apr. 19, 2004.

FIELD OF THE INVENTION

This invention relates to the use of layered assemblies formed of calixarene molecules to selectively separate and purify volatile gases.

BACKGROUND OF THE INVENTION

Sustained global dependence on fossil fuels as a primary source of energy is beset by several intractable problem, including dwindling reserves, increasingly unacceptable levels of pollution and relatively low conversion efficiency. Of several proposed alternative technologies, hydrogen-based fuel cells have emerged as being particularly attractive, especially for mobile applications. Much still needs to be accomplished in order to realize the necessary infrastructure and technological advances that will ultimately lead to the production, purification, transport, storage, and conversion of hydrogen as an everyday consumer commodity.

In the short term, escalated production of hydrogen will most likely continue to rely on conventional technologies such as steam reforming of natural gas:

$$CH_4 + H_2O \rightarrow CO + 3H_2$$

followed by the water gas shift reaction:

$$CO + H_2O \rightarrow CO_2 + H_2$$

The final step in this process involves the purification of $H_2$ by removing impurities such as $CH_4$, CO, $H_2O$, and primarily $CO_2$.

Separation technology is critical to the deployment of hydrogen as a source of energy, since the purity of hydrogen supplied to fuel cells affects their performance and longevity, and therefore their economic viability. To fulfill its promise, the hydrogen economy will require compact, durable, and inexpensive purification devices.

Conventional hydrogen plants are generally based on the use of pressure swing adsorption (PSA) for final hydrogen purification. PSA utilizes the difference in adsorption properties of various molecules so that components of a gas mixture are selectively adsorbed onto a solid matrix at high pressure and then subsequently desorbed by lowering the pressure. In recent years, both design and operation of PSA processes have developed to the extent that any notable further improvements in gas separation necessitates the discovery of a novel adsorbent material. Zeolites and activated carbon are currently employed as the solid matrix. While carbon nanotubes and metal-organic frameworks have undergone substantial scrutiny in this area, molecular crystals have received little consideration. This is likely because the constituent molecules of molecular crystals generally pack with an efficiency that has been deemed to preclude porosity.

Calixarenes are complex cyclic compounds that can undergo self-assembly to form supramolecular crystalline complexes. The simplest calixarenes is calix(4)arene in which four phenyl groups are linked together in a cyclic array by methylene bridges that are proximal to the OH groups of the phenols. Stress induced within the calixarene molecules result in indented or bowl-shaped cavities that can result in lattice voids. However, calixarenes lattices are considered to be non-porous and do not have any channels providing access to these lattice voids.

The assembly of organic molecular crystals such as those based on supramolecular assemblies of calixarene molecules is primarily controlled by a variety of intermolecular interactions that, in unison, immobilize the building blocks to form stable arrays. When these materials are heated beyond their melting or sublimation points, the cohesive forces are overcome, resulting in increased mobility and disorganization of the molecules. The molecules of a solid can also be mobilized by processes such as dissolution and solid-solid phase changes. The latter can occur as a result of physical stimuli (e.g. temperature, pressure, radiation) or the gain or loss of ancillary molecular components.

While inclusion of either a liquid or a gaseous guest by a solid matrix is a well-known phenomenon, the mechanisms of such processes are not well defined. In organic solid-state guest-host assemblies, transport of the guest through the host, and subsequent complexation, usually involves concomitant reorganization of the host lattice. Guest-induced lattice rearrangement often result in severe fracturing of single crystals into polycrystalline material. When fracturing does not occur, alternative mechanisms postulate the presence of stable channels through which mobile guest molecules diffuse until a thermodynamically stable host-guest structure is achieved. Therefore, it would not appear that relatively small volatile gas molecules, such as $N_2$, $O_2$, air, CO, and $CO_2$ that do not have strong intermolecular interactions to provide the impetus for lattice rearrangement, would be able to be incorporated into a nonporous crystalline lattice.

SUMMARY OF THE INVENTION

In accordance with the present invention, there is provided a method of using a crystallographic framework of calixarene molecules to selectively separate and/or store volatile gas components. The calixarene molecules are preferably calix[4]arene and derivatives of calix[4]arenes. The calixarene molecules are substituted, preferably at the para position, such that the calixarene is sterically bulky. A preferred calixarene for use in carrying out the invention is p-tert-butyl calix[4]arene. The sterically bulky calixarene molecules form a crystalline lattice that has relatively large lattice voids but is nonporous.

In one aspect of the invention, a guest host assembly is provided comprising an essentially nonporous crystallographic layered assembly of sterically bulky calixarene molecules associated primarily due to van der Waal's forces. A desired volatile gas guest component, such as $N_2$, $O_2$, CO, or $CO_2$, is incorporated into the host assembly without any physical rearrangement of the lattice structure, by contacting the gas with the assembly. The crystallographic layered assembly of the guest-host complex has the same unit cell and layered structure as a layered assembly of calixarene molecules that does not have any volatile gas guest component.

In another aspect of the invention, a method is provided for the use of the calixarenes described above to purify a gas mixture by removing one or more volatile gas contaminants. The volatile gas mixture, containing a desired gas component and at least one volatile gas contaminant is passed over or through a layered assembly of the calixarene molecules. The calixarene selectively absorbs and removes from the gas mixture one or more of the contaminant components, thereby purifying the desired gas component. Most preferentially, the desired gas component is hydrogen and the calixarene purifies the hydrogen component by selectively absorbing the carbon dioxide and/or carbon monoxide components.

In another aspect of the invention, a method is provided for the use of the calixarenes described above to remove and store a desired volatile gas, such as $N_2$, $O_2$, CO, or $CO_2$. The gas or a gaseous mixture containing the gas is passed over or through a layered assembly of the calixarene molecules and the calixarene selectively absorbs the desired volatile gas and stores it in the lattice structure. Most preferentially, the method is used to remove and store carbon dioxide from a stream of combustion gases or to remove and store oxygen from air.

BRIEF DESCRIPTION OF THE DRAWINGS

The invention is further described and explained in relation to the following figures wherein.

DETAILED DESCRIPTION OF THE INVENTION

Figure 1:
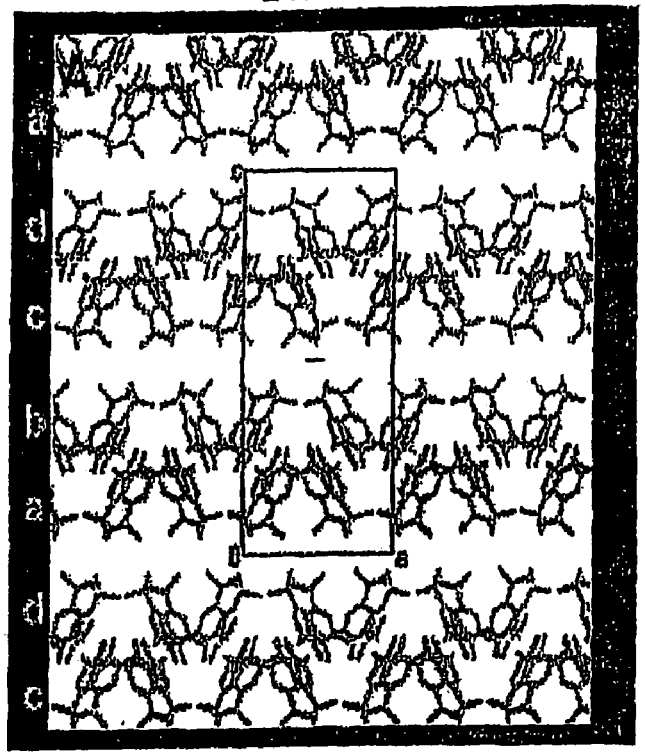
FIG. 1 is representation of the structure of a crystal of p-tert-butyl calix[4]arene formed upon sublimation.

The present invention involves an organic supramolecular crystallographic framework that is stabilized predominately by van der Waals interactions and which is selectively permeable to volatile gas guest components. The supramolecular assemblies involved in the present invention are based upon assemblies of calixarenes or derivatives of calixarenes. The preferred application of the invention involves the use of para-substituted calix[4]arenes, such as p-tert-butyl calix[4]arene, p-tert-adamantyl calix[4]arene, and p-tert-octyl calix [4]arene. It is expected that all other sterically bulky calix[4] arenes will be similarly useful in the current invention. Derivatives of such calixarenes can also be employed in the invention. However, contrary to functionalized calixarenes, such as resorcinarenes, the calixarenes employed in the present invention are assembled predominantly by van der Waals forces as opposed to strong chemical bowfin, such as may be achieved through the use of functional substituents on the aromatic nuclei. For illustrative purposes, the invention will be described in detail with regard to the use of p-tert-butyl calix[4]arene to form stacked layered calixarene assemblies for the purification and storage of volatile gas guest moieties.

The calixarenes comprise an extensively studied class of macrocyclic polyphenolic compounds that are usually strongly associated with host/guest inclusion chemistry. The simplest representative of this family of compounds is calix [4]arene, which forms from four methylene-bridged phenyl groups, as indicated by the following structural formula:

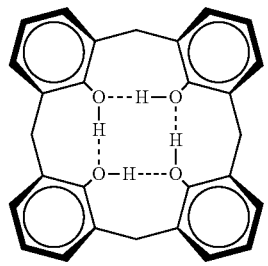

(1)

Calix[4]arene provides a bowl-shaped molecule with a shallow cleft and a rigid cone conformation, which is stabilized by a cyclic array of hydrogen bonds between adjacent phenolic OH groups at the lower rim.

While the calixarene compounds employed in carrying out the present invention will normally be fully aromoized, as indicated by the Structure (1), one or more of the aryl groups may be hydrogenated. For example, a calixarene suitable for use in carrying out the present invention would include cyclohexylcalixarene in which one aromatic group has been hydrogenated to form a cyclohexyl group, as indicated by the following structural formula.

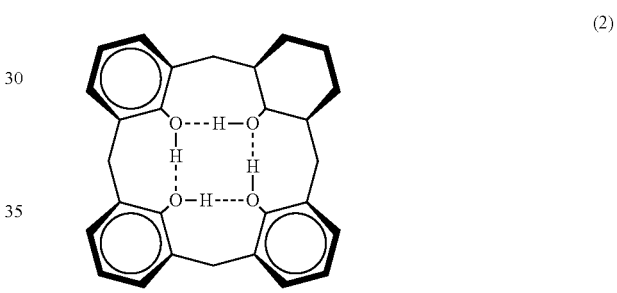

(2)

In addition, the bridge groups formed by the methylene bridges can be replaced by other bridged structures which are sterically similar to the methylene bridges. For example, sulfur bridges can be provided in lieu of the carbon bridges, as indicated by the thiocalixarene shown by the following structural formula.

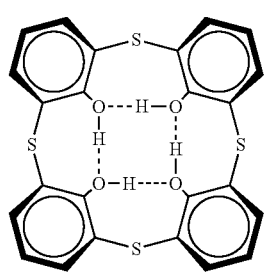

(3)

Other suitable bridging agents would include silanyl groups in which the methylene groups are replaced with silanyl, $—SiH_2—$. As will be recognized by those skilled in the art, such calixarene derivatives bear a very close stearic configuration to the normally encountered calixarenes. Such compounds may also incorporate hydrogenated aromatic groups, similarly as shown by the cyclohexyl-calix[4]arene of Formula (2).

While crystallographic assemblies based on calix[4]arene are preferred in carrying out the present invention, calixarene crystallographic assemblies based upon calixarene molecules of higher molecular weight may also be employed in the invention. Thus, the calixarene molecules forming the crystallographic assembly may be characterized as calix[n]arene in which n is an integer within the range of 4-8. The calixarene molecules are distally substituted and may include distally substituted calix[5]arene, calix[6]arene and calix[8]arenes. For a further description of crystallographic frameworks based upon such calixarenes, reference is made to U.S. patent application Ser. No. 10/286,179 by the present inventors, filed Oct. 31, 2002, and published as publication no. US2004/0087666 A1, the entire disclosure of which is incorporated herein by reference.

The embodiment of the invention carried out involving calix[4]arene will be described with reference to the fully aromatized methylene-bridged calix[4]arene depicted by Formula (1). However, it will be recognized that such description is also applicable to the use of calix[4]arene involving hydrogenated aryl groups, as depicted by Formula (2), or by calix[4]arenes formed with bridges other than methylene bridges, such as depicted by Formula (3).

Preferably, the calixarenes employed in the present invention are parasubstituted, that is, substituted at the directly distal position relative to the OH group at the lower rim of the calixarene molecule, as indicated by the following structural formula of para substituted calix[4]arene.

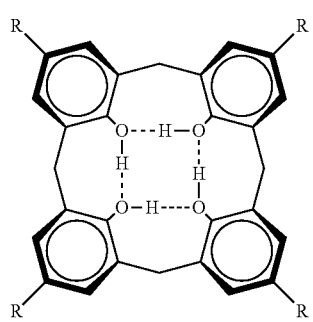

(4)

In formula (4), R is a substituent, preferably a somewhat bulky substituent, which can function as described later to sterically interact within the calixarene cavity of an adjacent calixarene molecule. The nature of the distal substituents on the calixarene molecules may also vary. While the substituent is preferably isopropyl, tertiarybutyl, or an isoamyl group such as an isopentyl or a neopentyl, other substituent groups can include aromatic groups such as phenyl groups or cycloalkyl groups such as cyclohexyl groups. Preferably, the substituent is a tertiary butyl group so that the calixarene is shown by the following structural formula.

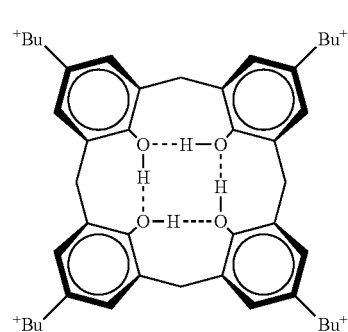

(5)

The inclusion and transport of low molecular weight hydrocarbons in sublimed, unsolvated calixarenes has already been shown to occur through phase shifting of the crystalline lattice, as described in the aforementioned U.S. patent application Ser. No. 10/286,179, filed Oct. 31, 2002, the content of which is incorporated herein. This phase shifting does not result in fracturing of the crystals and the crystals do not have any stable channels. Instead, there is an ~6 Å lateral shift in the bilayers relative to one another in order to allow guest diffusion and to achieve a well packed final structure. This shift results in a guest-host assembly where the bilayers are shifted and the unit cell of the lattice is less than in the corresponding assembly of calixarenes without the guest molecules. It is believed that this shift is caused by the appreciable intermolecular interactions that can provide the impetus for rearranging the host molecules as part of a dynamic inclusion process. In contrast, volatile gases such as $O_2$, $N_2$, CO, and $CO_2$ possess characteristically weak interactive capabilities and so are not believe to be able to undergo this dynamic inclusion process.

The present invention involves the incorporation of gaseous guest species in a structure of a purely organic solid that has very low porosity, that is, it is essentially nonporous, and does not contain channels, but nevertheless allows the diffusion of the guest species through its lattice. Unlike the uptake of low molecular weight hydrocarbons discussed above, it has been discovered that volatile gases such as $N_2$, $O_2$, CO, and $CO_2$ are able to diffuse into the lattice under ambient conditions without any phase shift or other discernable disruption to the lattice and without the need for suitably sized pores.

In describing the crystallographic assemblies referred to herein, conventional crystal lattice nomenclature is employed. Thus, crystallographic structures are characterized in terms of a vertical c axis and two horizontal a and b axes at an orientation of 90° to one another.

Crystals of p-tert-butyl-calix[4]arene were prepared by sublimation of p-tert-butyl calix[4]arene at 280° C. under a reduced pressure of 1-10 tort Single crystal x-ray analysis of the resulting sublimed unsolvated form of p-tert-butyl calix [4]arene, reveals that the calixarene molecules arrange themselves into a bilayer packing motif of a type conforming to that described in A. W. Coleman et al., *Angew. Chem., Int. Ed. Engl.* 27, 1361(1988). Pairs of offset facing calixarene molecules are characterized as dimers that form skewed capsules, each with an estimated free volume of 235 Å$^3$. As a result of these relatively large lattice voids, the sublimed, unsolvated p-tert-butyl calix[4]arene has a rather low packing efficiency (p.e.) of 0.59. In comparison, it should be noted that a polymorphic form of p-Bu$^t$-calix[4]arene grown from a tetradecane solution, has been described in E. B. Brouwer et al., *Chem. Commun.* 565 (2001). The structure of unsolvated p-tert-butyl calix[4]arene crystallized from a tetradecane solution consists of a well-packed (p.e.=0.67) arrangement of calixarene dimers, where each of the two facing molecules inserts one of its tert-butyl groups deep into its neighbor's cavity. The x-ray powder diffraction pattern of the p-tert-butyl calix[4]arene in polymorphic Form 1 (as crystallized from a tetradecane solution) and Form 2 (as sublimed, unsolvated) as calculated from a single crystal x-ray diffraction data are set forth in Tables 1 and 2, respectively. Tables 1 and 2 set forth the value of a two-theta (theta being the bragg angle) with the corresponding interplanar d spacings in angstroms, along with the relative intensities of the x-ray reflections observed at the indicated d spacings.

TABLE 1 p-tert-butyl calix[4]arene, polymorph Form 1, calculated from single crystal X-ray diffraction data

| 2θ | d spacing | relative intensity |
|---|---|---|
| 7.52 | 11.75 | 100 |
| 9.81 | 9.01 | 21 |
| 10.23 | 8.64 | 63 |
| 11.49 | 7.70 | 56 |
| 14.12 | 6.27 | 44 |
| 14.20 | 6.23 | 22 |
| 15.20 | 5.82 | 24 |
| 16.11 | 5.50 | 28 |
| 16.42 | 5.39 | 18 |
| 16.54 | 5.36 | 42 |
| 17.55 | 5.05 | 58 |
| 18.79 | 4.72 | 27 |
| 19.42 | 4.57 | 18 |
| 19.69 | 4.50 | 26 |
| 20.07 | 4.42 | 43 |
| 20.10 | 4.41 | 27 |
| 21.47 | 4.14 | 20 |
| 21.56 | 4.12 | 18 |
| 21.91 | 4.05 | 28 |
| 23.78 | 3.74 | 23 |

TABLE 2 p-tert-butyl calix[4]arene, polymorph Form 2, from powder X-ray diffraction data

| 2θ | d spacing | relative intensity |
|---|---|---|
| 6.48 | 13.62 | 100 |
| 13.78 | 6.42 | 8 |
| 16.70 | 5.31 | 6 |
| 16.78 | 5.28 | 6 |
| 20.02 | 4.43 | 14 |
| 20.44 | 4.34 | 6 |

*2θ values are +/−0.10°

Purely organic solid-state frameworks rarely contain substantial lattice voids such as those observed in sublimed, unsolvated p-tert-butyl calix[4]arene. Indeed, the molecular arrangement in the unsolvated p-tert-butyl calix[4]arene crystallized from tetradecane solution clearly demonstrates that p-tert-butyl calix[4]arene is capable of packing quite efficiently in its pure form. The striking disparity in packing efficiency between sublimed, unsolvated p-tert-butyl calix[4]arene, Form 2 (Table 2), and the unsolvated p-tert-butyl calix[4]arene as crystallized from a tetradecane solution, Form 1 (Table 1), supports the view that sublimed, unsolvated p-tert-butyl calix[4]arene should readily undergo guest inclusion reactions in order to gain further thermodynamic stability.

The sublimed, unsolvated p-tert-butyl calix[4]arene form of p-tert-butyl calix[4]arene crystallizes in the monoclinic system (space group $P112_1/n$) and the calixarene molecules are stacked in an up-down fashion in discrete layers designated as a, b, c and d along the crystallographic c axis (FIG. 1). Bilayers ab and cd each comprise closely-packed calixarene molecules with a stacking interval of 13.12 Å. Both surfaces of each bilayer are lined with tert-butyl groups which form bulky protrusions separated by small crevices. Adjacent bilayers are only slightly interdigitated: three tert-butyl groups of each calixarene moiety nestle into the crevices of an adjacent bilayer surface, while the remaining $Bu^t$ group is positioned in a gap between several neighboring molecules. Owing to a less constricted environment, the latter is disordered over two positions. An inspection of the sublimed, unsolvated p-tert-butyl calix[4]arene shows clearly that the structure is not porous.

Figure 2:
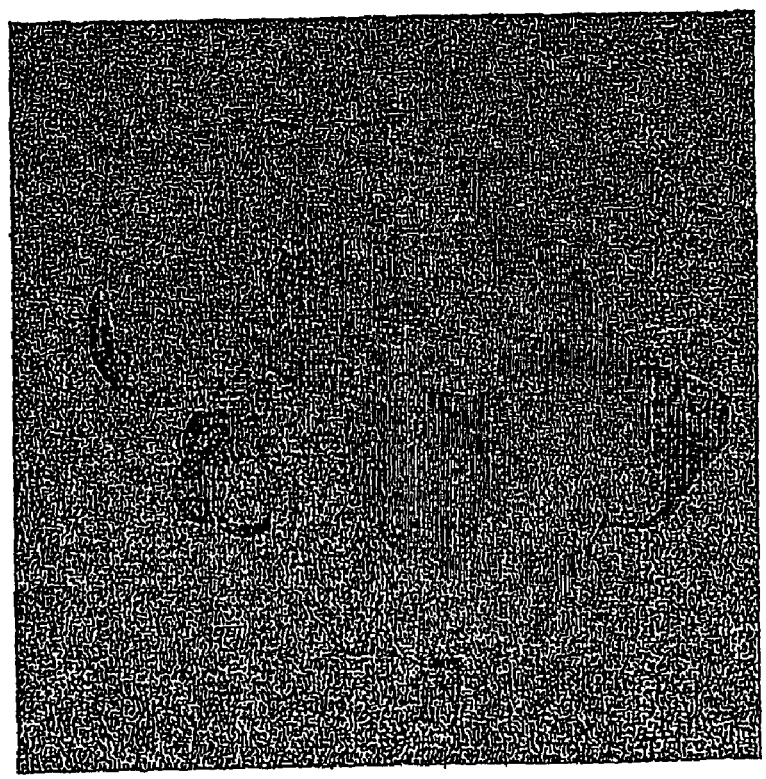
FIG. 2 is a representation of a section through a p-tert-butyl calix[4]arene dimer formed upon sublimation.

FIG. 2 shows a graphical representation of a section through a para tertiary butyl calix[4]arene dimer formed upon sublimation. The two empty calixarene cavities face one another and combine to form a relatively large hourglass-shaped void that has an estimated free volume of 235 Å. The gaps that are visible between the tert-butyl groups at the equator of the dimer are blocked by tert-butyl groups of neighboring calixarenes. Therefore, there are no channels leading to the void in the lattice structure.

Upon exposure to the atmosphere, air is absorbed into the lattice structure. This can be seen by the presence of residual electron density in the lattice void using x-ray analysis. In addition, after exposure to air, bubbles emanate from the crystal upon the addition of liquid nitrobenzene. Because the crystals are sublimed under a vacuum at 230° C. and x-ray analysis shows that there is no residual electron density located within the calixarene cavity of freshly sublimed crystals, the possibility that the lattice forms around small gas molecules can be ruled out.

After exposure to the atmosphere for two hours, x-ray analysis shows a significant level of residual electron density within the calixarene cavity. Although the residual electron density could not be resolved as either $O_2$ or $N_2$, presumably due to a combination of thermal motion, partial occupancy, and disorder, the reasonable conclusion is that this density is due to the absorption of air from the atmosphere. Therefore, it is clear that sublimed p-tert-butyl calix[4]arene forms a guest-host assembly by absorbing volatile gases without the need for any phase change or adequate pores in the crystalline lattice. This guest-host assembly is created by contacting the p-tert-butyl calix[4]arene lattice with the desired volatile gas guest and allowing it to be absorbed by the lattice. The volatile gas can also be removed from the p-tert-butyl calix[4]arene without any rearrangement of the crystalline lattice by reducing the pressure so the gaseous guest molecules diffuse back out of the calixarene.

Figure 3:
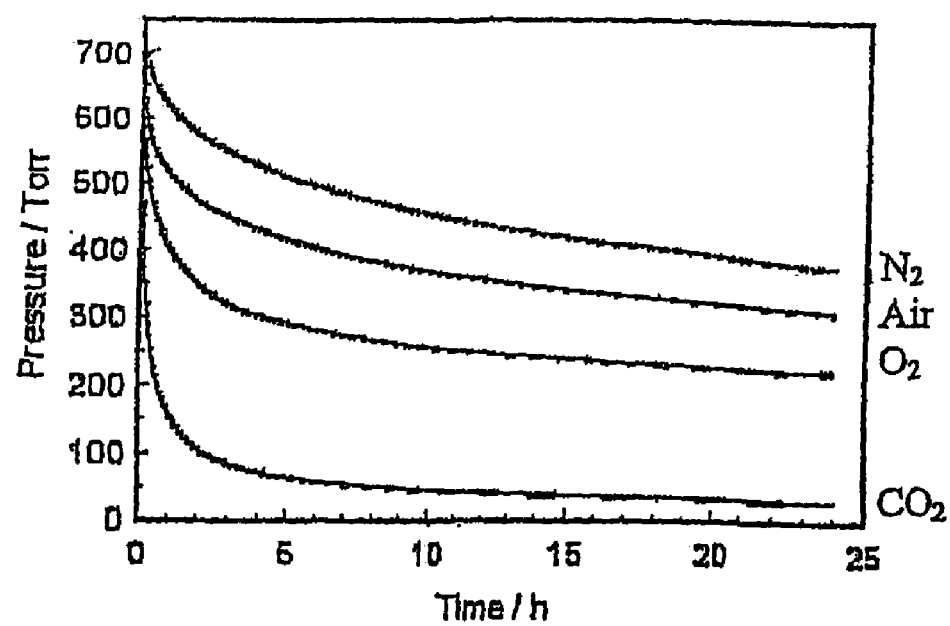
FIG. 3 is a graph of the sorption isotherms for air, $N_2$, $O_2$, and $CO_2$ showing pressure measured in torr on the ordinate axis and time in hours on the abscissa axis.

FIG. 3, is a graph of the sorption isotherms for air, $N_2$, $O_2$, and $CO_2$ showing pressure measured in torr on the ordinate axis and time in hours on the abscissa axis. The sorption isotherms were recorded at 23° C. and an initial pressure of approximately 700 torr (93.3 kPa). A freshly sublimed crystal weighing 5.714 grams of p-tert-butyl calix[4]arene was used and the chamber was evacuated for at least one hour between experiments to remove the absorbed gas from the sample. In all cases, the pressure reached equilibrium over a period of about 24 hours.

FIG. 3 also establishes that the crystals are able to discriminate between the various gases in both the rate of absorption as well as the amount absorbed. In fact, since air is approximately 78% $N_2$ and 21% $O_2$, the sorption rates for air, $N_2$, and $O_2$ are approximately self-consistent. Of the three gases tested, $CO_2$ is absorbed significantly quicker and to a significantly greater extent than either $N_2$ or $O_2$. This ability to discriminate between the various gases can be exploited to selectively separate these volatile gases. For example, p-tert-butyl calix[4]arene can be used to selectively separate $O_2$ from the air or to trap and store $CO_2$ produced by a hydrocarbon burning vehicle, power plant, or other process.

Figure 4:
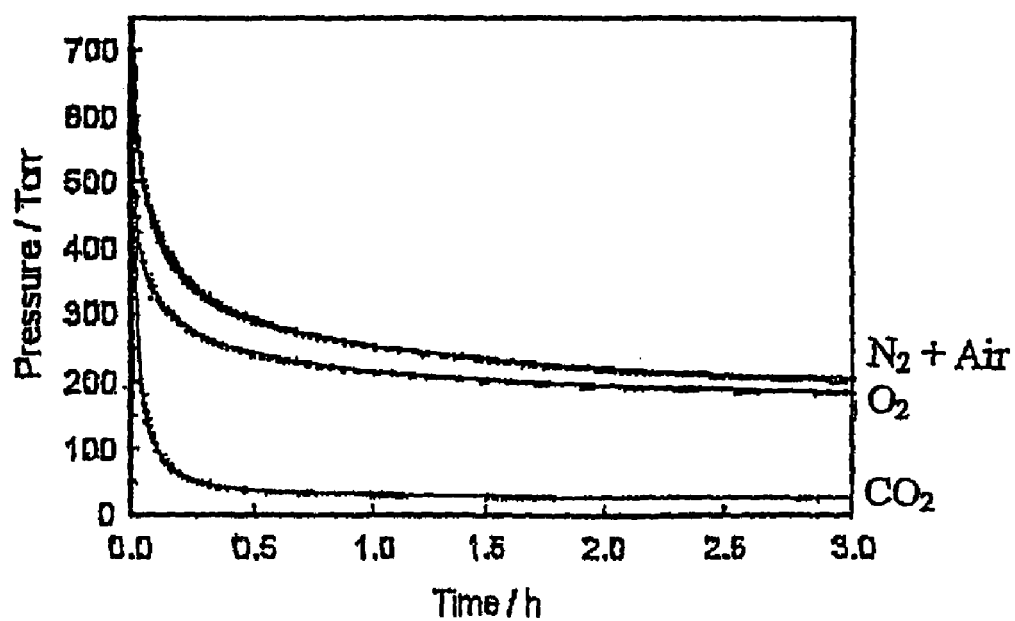
FIG. 4 is a graph of the sorption isotherms for air, $N_2$, $O_2$, and $CO_2$ where the calixarene crystal had been crushed with a mortar and pestle, showing pressure measured in torr on the ordinate axis and time in hours on the abscissa axis.

FIG. 4 is a graph of the sorption isotherms for air, $N_2$, $O_2$, and $CO_2$ where the calixarene crystal had been crushed with a mortar and pestle, showing pressure measured in torr on the ordinate axis and time in hours on the abscissa axis. Note that in FIG. 4 the sorption isotherms for air and $N_2$ are overlapped. As can be seen by comparing FIGS. 3 and 4, crushing the calixarene crystal markedly increases the rate of gas absorption but does not affect the equilibrium pressure. This establishes that the volatile gasses are assimilated into the lattice structure of the crystal as opposed to being adsorbed onto the surface of the particles, since the total amount of adsorption would have been increased by increasing the available surface area. It is also shown that the selectivity between $O_2$ and $N_2$ is diminished markedly when the particle size is reduced. However, the selectivity between $CO_2$ and the other gases remains substantial.

Figure 5:
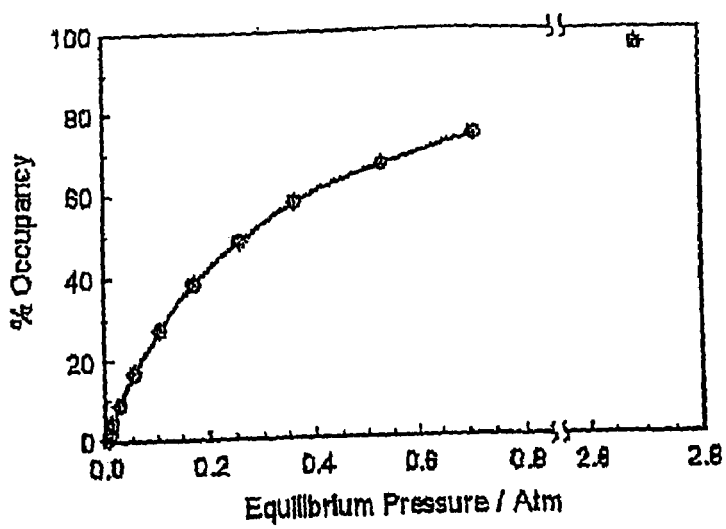
FIG. 5 is a graph of the occupancy of the lattice voids by $CO_2$, showing percent occupancy on the ordinate axis and equilibrium pressure in atmospheres on the abscissa axis.

FIG. 5 is a graph of the occupancy of the lattice voids by $CO_2$, showing percent occupancy on the ordinate axis and equilibrium pressure in atmospheres on the abscissa axis. It reveals a Type I relationship between the equilibrium pressure and the percentage of calixarene cavities occupied by $CO_2$. It is assumed that there is a 2:1 molar ratio of TBC4:$CO_2$ since two calixarene molecules are required to form each lattice void. At approximately 3 atmospheres, each lattice void can be almost fully occupied by one gas molecule. Even at one, atmosphere the occupancy is almost 80%.

Based on the data collected regarding air, $N_2$, $O_2$, and $CO_2$, it was completely unexpected that exposure of the calixarene crystal to the smaller molecules of $H_2$ gas, even at pressures up to 7 atmospheres, did not result in any discernable absorption of the gas. The $H_2$ molecules may be in fact be diffusing through the lattice, but if this is the case, they are not being retained in the lattice for any significant period of time.

Figure 6:
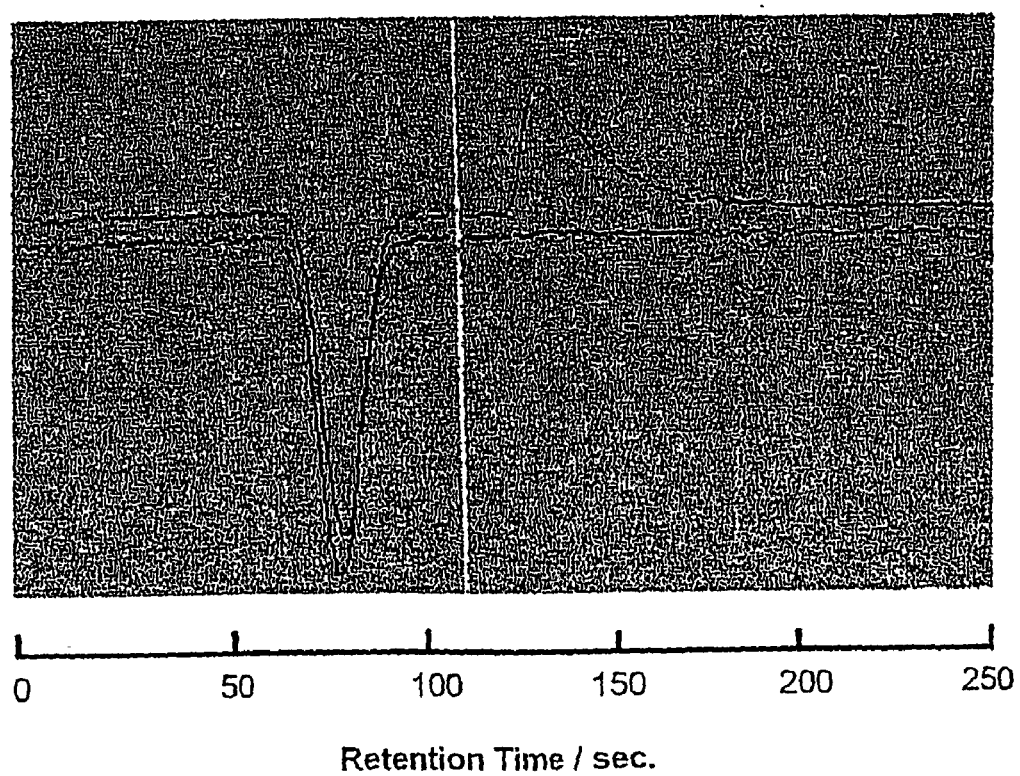
FIG. 6 is a gas chromatogram illustrating the composition of a mixture of carbon dioxide and hydrogen before and after purification by a crystallographic structure of para tertiary butyl calix[4]arene.

Based on the large disparity between the affinity of the p-tert-butyl calix[4]arene substrate for $CO_2$ and $H_2$, separation of these two gases using the calixarene was attempted. A sublimed crystal weighing 5.714 grams of p-tert-butyl calix[4]arene was exposed to a 3:1 $CO_2$:$H_2$ mixture at an initial pressure of 1 atmosphere for 19 hours. The composition of the mixture, both before and after the exposure to the p-tert-butyl calix[4]arene was determined using gas chromatography. FIG. 6 is a gas chromatogram showing the composition of the $CO_2$$H_2$ mixture both before and subsequent to the gas sample being subjected to p-tert-butyl calix[4]arene. The intensity of the $H_2$ peak, shown in the left box, does not change during the experiment, while the $CO_2$ peak, shown in the right box, entirely disappeared. This indicates that the p-tert-butyl calix[4]arene selectively absorbed the $CO_2$, thereby purifying the $H_2$ gas that remained. Based on this selective absorption, the crystalline calixarene can be used to purify a stream of $H_2$ gas by removing the $CO_2$ and/or CO simply by passing the gas mixture over or through the calixarene crystals. This is especially useful in the production of $H_2$, because the current commercial methods generate $H_2$ in the presence of $CO_2$ and CO. Additional experiments have shown that the calixarenes are also capable of preferentially removing CO and that other bulky calix[4]arenes, notably p-tert-adamantyl calix[4]arene and p-tert-octyl calix[4]arene, provide similar results to p-tert-butyl calix[4]arene.

The above descriptions of certain embodiments are made for the purposes of illustration only and are not intended to be limiting in any manner. Other alterations and modifications of the preferred embodiment will become apparent to those of ordinary skill in the art upon reading this disclosure, and it is intended that the scope of the invention disclosed herein be limited only by the broadest interpretation of the appended claims to which the inventor is legally entitled.

The invention claimed is:

1. A method of purifying a gas stream by the removal of a volatile gas constituent comprising:
    (a) providing a crystallographic layered assembly formed of layers of sterically bulky calixarene molecules in a repeating configuration held together predominantly by van der Waals forces and containing relatively large lattice voids;
    (b) contacting a gas stream containing at least one volatile contaminant with said crystallographic assembly for a time sufficient to absorb said at least one volatile gas contaminant from said gas stream into said crystallographic assembly to form a purified gas stream under conditions in which said crystallographic assembly has a lattice structure and a phase which does not change upon absorption of said volatile gas contaminant.

2. The method of claim 1 wherein said bulky calixarene molecules are substituted in the para-position with a bulky substituent.

3. The method of claim 2 wherein said bulky substituent is selected from the group consisting of an isopropyl group, a tertiary butyl group, an isoamyl group, a cycloalkyl group and an aromatic group.

4. The method of claim 2 wherein said bulky calixarene molecules are calix[4]arene molecules.

5. The method of claim 1 wherein said crystallographic assembly is crushed prior to contacting with the gas stream.

6. The method of claim 1 wherein said gas stream is a hydrogen gas stream and said contaminant is selected from the group consisting of carbon dioxide, carbon monoxide, and mixtures thereof.

7. The method of claim 1 wherein said calixarene molecules are fully aromatized.

8. The method of claim 1 wherein said lattice voids have a volume of about 235 Å$^3$.

9. The method of claim 1 further comprising, subsequent to subparagraph (b), terminating the contact of said gas stream with said crystallographic assembly; and thereafter recharging said crystallographic assembly by placing said assembly under a reduced pressure to remove said volatile gas constituents from said assembly.

10. A method of storing a volatile gas comprising:
    (a) providing a crystallographic layered assembly formed of layers of sterically bulky calixarene molecules in a repeating configuration held together predominately by van der Waals forces and containing relatively large lattice voids; and
    (b) contacting a volatile gas with said crystallographic assembly for a time sufficient to absorb said volatile gas into said crystallographic assembly under conditions in which said crystallographic assembly has a lattice structure and a phase which does not change upon absorption of said volatile gas.

11. The method of claim 10 wherein said bulky calixarene molecules are substituted in the para-position with a bulky substituent.

12. The method of claim 11 wherein said bulky substituent is selected from the group consisting of an isopropyl group, a tertiary butyl group, an isoamyl group, a cycloalkyl group and an aromatic group.

13. The method of claim 10 wherein said bulky calixarene molecules are calix[4]arene molecules.

14. The method of claim 10 wherein said crystallographic assembly is crushed prior to contacting with said volatile gas.

15. The method of claim 10 wherein said calixarenes molecules are fully aromatized.

16. The method of claim 10 wherein said lattice voids have a volume of about 235 $Å^3$.

17. The method of claim 10 wherein said volatile gas comprises a mixture of volatile gas constituents.

18. The method of claim 10 further comprising, subsequent to subparagraph (b), terminating the contact of said gas stream with said crystallographic assembly; and thereafter recharging said crystallographic assembly by placing said assembly under a reduced pressure to remove said volatile gas constituents from said assembly.

19. A guest-host assembly comprising a host assembly formed of a crystallographic layered assembly formed of layers of sterically bulky calixarene molecules in a repeating configuration held together predominantly by van der Waals forces and containing relatively large lattice-voids, a guest component selected from the group consisting of nitrogen, oxygen, carbon dioxide, carbon monoxide, and mixtures thereof; located within said host assembly, and said calixarene molecules being configured in bilayers of adjacent layers in the same phase as a corresponding assembly of calixarene molecules without said guest component.

20. The assembly of claim 19, wherein said bulky calixarene molecules are substituted in the para-position with a bulky substituent.

21. The assembly of claim 19 wherein said bulky substituent is selected from the group consisting of an isopropyl group, a tertiary butyl group, an isoamyl group, a cycloalkyl group and an aromatic group.

22. The assembly of claim 19 wherein said bulky calixarene molecules are calix[4]arene molecules.

23. The guest-host assembly of claim 22 wherein said calixarene molecules are para R calix[4]arene wherein R is selected from the group consisting of an isopropyl, a tertiary butyl, an isoamyl, cycloalkyl, and aromatic substituents.

24. The guest-host assembly of claim 23 wherein said calix[4]arene molecules are p-tert-butyl calix[4]arene.

25. The guest host assembly of claim 24 wherein said lattice voids have a volume of about 235 $Å^3$.

\* \* \* \* \*